US006950872B2

(12) United States Patent
Todd, II (10) Patent No.: US 6,950,872 B2
(45) Date of Patent: Sep. 27, 2005

(54) METHODS AND SYSTEMS FOR FACILITATING MESSAGE EXCHANGE BETWEEN NETWORKED COMPUTING ENTITIES

(75) Inventor: James W. Todd, II, Campbell, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 625 days.

(21) Appl. No.: 10/028,195

(22) Filed: Dec. 19, 2001

(65) Prior Publication Data

US 2003/0167296 A1 Sep. 4, 2003

(51) Int. Cl.[7] .............................................. G06F 15/16
(52) U.S. Cl. ........................ 709/227; 709/232; 709/235
(58) Field of Search ................................ 709/227, 232, 709/235

(56) References Cited

U.S. PATENT DOCUMENTS

| | | | | |
|---|---|---|---|---|
| 6,131,163 A | * | 10/2000 | Wiegel | 713/201 |
| 6,377,993 B1 | * | 4/2002 | Brandt et al. | 709/227 |
| 6,606,708 B1 | * | 8/2003 | Devine et al. | 713/201 |
| 6,631,402 B1 | * | 10/2003 | Devine et al. | 709/217 |

* cited by examiner

Primary Examiner—Krisna Lim
(74) Attorney, Agent, or Firm—Martine Penilla & Gencarella, LLP (57) ABSTRACT

Methods for establishing communication between computing entities are provided. In one example, a service model illustrates communication with a web server using a service proxy to manage a communication exchange. The service model includes a dispatcher within the service proxy to process the communication exchange. The processing of the communication exchange includes defining a request, defining a container in which to enclose the request, defining a post request event to dispatch the container with the request, and defining a response container for obtaining a response to the request. The container with the request is transmitted through the web server to a service for a responding entity. The service uses a delegate registry to map the request to a delegate which obtains a response from the responding entity. The response is formatted and transmitted through the web server to the service proxy which provides the response to the requesting entity.

20 Claims, 6 Drawing Sheets

METHODS AND SYSTEMS FOR FACILITATING MESSAGE EXCHANGE BETWEEN NETWORKED COMPUTING ENTITIES

BACKGROUND OF THE INVENTION

1. Field of the Invention

The present invention relates generally to communication between systems in the context of web services, and more specifically to a message exchange framework and methods.

2. Description of the Related Art

Communication between systems such as in business-to-business applications, web services, data base mining, and the like increasingly rely on developing XML (eXtensible Markup Language) technology for developing, disseminating, and exchanging data and knowledge. As newer and more robust systems emerge implementing advanced technologies, legacy systems remain vital contributors and resources. Legacy systems, however, need a method and system to enable communication and exchange with web servers and systems incorporating new communication protocols.

Web-enabling legacy systems typically involves communications APIs (Application Programming Interfaces). Communications APIs, however, tend to include low level dependencies, and emerge as complex systems incorporating protocol-specific and application-specific coding. Such communication APIs are therefore severely limited in development and deployment opportunities.

What is needed are computer implemented methods and systems to web-enable legacy systems that are implemented based on open source and standard APIs, using protocols as required to access local, remote, and secure services in a common fashion. The web-enabling of legacy systems should be based on core principles of open source and standard APIs without constraints of remote procedure call limitations.

SUMMARY OF THE INVENTION

Broadly speaking, the present invention fills these needs by providing methods to web-enable legacy systems by providing a message exchange framework implemented in a service model. The present invention can be implemented in numerous ways, including as a process, an apparatus, a system, a device, a method, or a computer readable media. Several embodiments of the present invention are described below.

In one embodiment, a computer implemented method for establishing communication between computing entities interconnected over a network is disclosed. The computer implemented method includes establishing communication with a web server to begin a communication exchange. A service proxy is executed to manage the communication exchange, and a dispatcher within the service proxy is executed. The dispatcher is configured to process the communication exchange which includes defining a request, defining a container for enclosing the request, defining a post request event for dispatching the container having the request, and defining a response container for obtaining a response to the request. The computer implemented method further includes transmitting the container enclosing the request and the response over the network to a responding entity. A response from the responding entity is received by the dispatcher in the response container.

In another embodiment, a method for enabling communication between a requesting entity and a responding entity is disclosed. The method includes receiving a request at the requesting entity, and the obtaining of the request by a service proxy. The service proxy is configured to generate a message for the request. The method further includes the service proxy dispatching the message to a service through a web server. The message is received at the service which has a delegate broker. The delegate broker is in communication with a delegate registry which associates the message with a delegate. The delegate is configured to communicate with the responding entity to process a transaction defined by the message.

In yet another embodiment, a computer readable media having program instructions for enabling communication between computing entities is disclosed. The computer readable media includes program instructions for invoking a service proxy to process a request by a requesting entity. The processing of the request includes receiving the request from the requesting entity, generating a message for the request, dispatching the message to a service through a web server, and preparing to receive a response. Further program instructions are included for receiving the message at the service, which includes a delegate broker, and for formatting a response which is obtained by the delegate broker, and for transmitting the response from the service to the service proxy.

Other aspects of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for web-enabling legacy systems is disclosed. In preferred embodiments, a service model includes computer implemented methods for establishing communication between computing entities interconnected over a network. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Methods of the present invention, as described herein implement the well known Java™ (hereinafter "Java") programming language. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Figure 1:
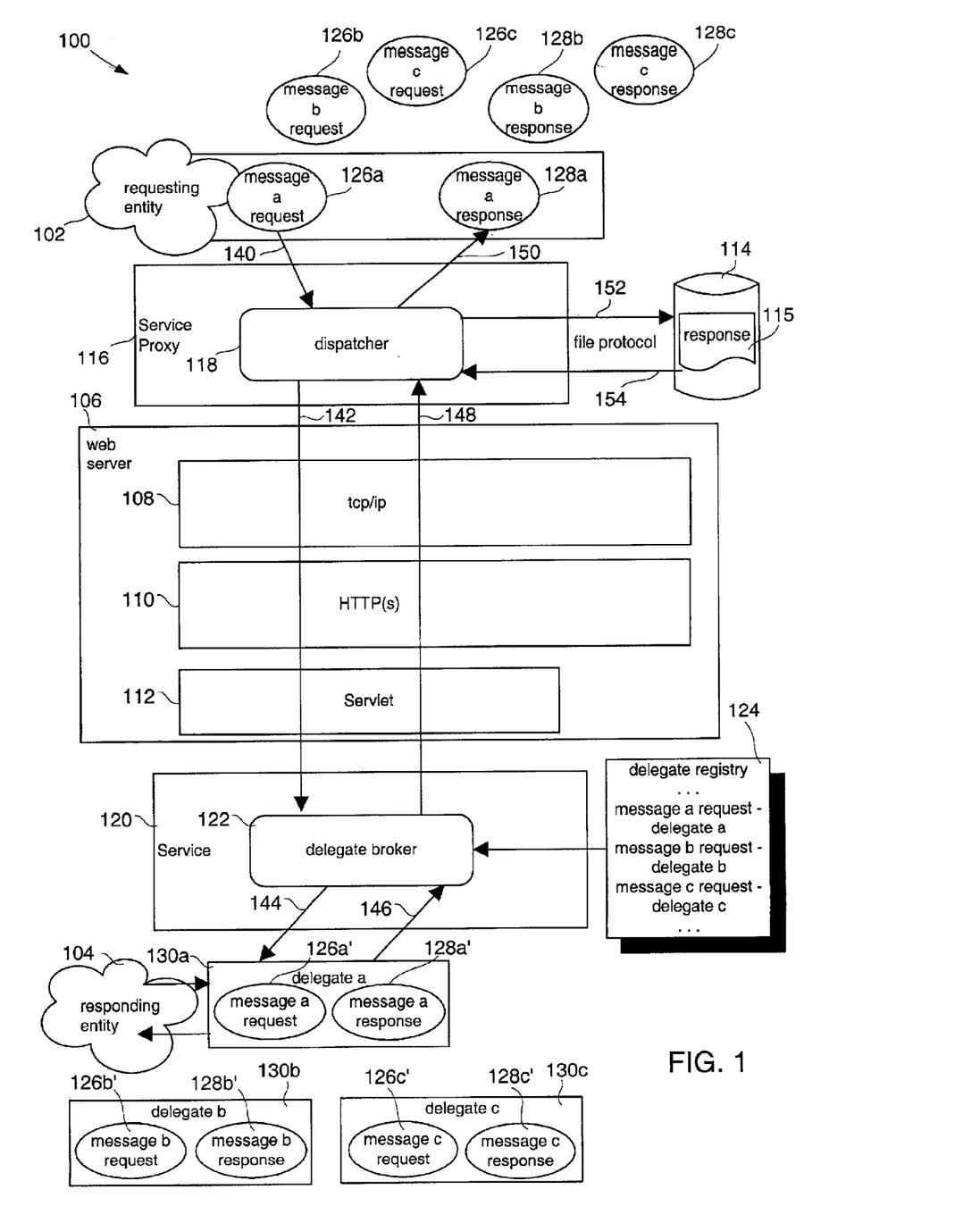
FIG. 1 illustrates a service model in accordance with one embodiment of the present invention.

Turning now to FIG. 1, a service model 100 in accordance with one embodiment of the present invention is illustrated. The service model 100 includes a requesting entity 102 and a responding entity 104. In one embodiment, the service model 100 represents a business-to-business exchange of data, such as the exchange of licensing data or rights, business data, and the like. For ease of understanding, a specific example of a business-to-business exchange of data is described in greater detail below in reference to FIG. 5.

In general, a business-to-business exchange might include a request for and receipt of data or information. Typically, a request is transmitted by a requesting entity 102 to a web server 106 which in turn transmits the request to a source of the requested information or data, e.g., responding entity 104. The web server 106 then receives a response, and transmits the response with the requested information or data to the requesting entity 102. Alternatively, a requesting entity 102 transmits a request through a web server 106 to a responding entity 104 which then processes the request, and provides a response.

The service model 100 illustrated in FIG. 1 illustrates an embodiment of an exchange between the requesting entity 102 and the responding entity 104 across web server 106. Additionally, exchange of information is illustrated between a requesting entity 102 and a data source 114 which does not involve communication across a web server 106.

In one embodiment, the requesting entity 102 and the responding entity 104 need not be previously known to each other, and need not be running the same types of operating systems using the same types or formatting of data. In accordance with known Internet and web protocols, dissimilar systems can effectively communicate, establishing the link to enable the service model 100 to conduct an exchange as illustrated, and enabling the requesting entity 102 to obtain data or information from a responding entity 104 to be used by the requesting entity 102 in a manner and format as required.

Typical Internet communication architecture is illustrated in the service model 100 as a web server 106. The exemplary Internet communication architecture of a web server 106 includes TCP/IP 108 Internet protocol, HTTP(S) 110 communication formatting protocol, and an exemplary Servlet 112. In the illustrated embodiment, HTTP(S) 110 provides for secure communication formatting protocol, which is common when sensitive, confidential, or private information is to be communicated. In alternative embodiments of the present invention, HTTP, FTP, file, and other communication formatting protocols are supported, as will be described in greater detail below. In one embodiment of the invention, the communication formatting protocol is independent of the present invention. The URL (Uniform Resource Locator) is the Internet address of the requesting entity 102, of the responding entity 104, as well as of the web server 106 having a Servlet 112 facilitating the data exchange, and establishes the communication formatting protocols supported or required by each entity. Typically, a requesting entity 102 calls a web server 106 having a web server URL. Therefore, when making the call to the web server 106, the URL of the web server 106 dictates the communication formatting protocol required or optionally supported, e.g., HTTP, HTTP(S), file, or FTP. Similarly, if a requesting entity 102 transmits directly to a responding entity 104, the URL of the responding entity 106 dictates the formatting protocol required or optionally supported.

The service model 100 illustrates an embodiment in which requesting entity 102 communicates, ultimately, with a responding entity 104 to conduct an information or data exchange. The requesting entity 102 invokes a service proxy 116 to broker the exchange. The service proxy 116 is configured to operate with Java classes to standardize a communication link between the requesting entity 102 and the web server 106, or the responding entity 104, through a file transfer protocol. The Java classes are defined in greater detail with reference to Tables 1–4 below. In one embodiment, an initial communication between the requesting entity 102 and the responding entity 104 is established across a web server 106, using Servlet 112, to coordinate and facilitate, by way of example, the purpose of the exchange, to validate the requesting entity 102 and responding entity 104, to establish rights or entitlement to the exchange, to coordinate format, and other such administrative functions. The requesting entity 102 and the responding entity 104 may or may not be known to each other. In one embodiment, the requesting entity 102 establishes communication with web server 106, and Servlet 112 facilitates communication with the appropriate responding entity 104 for the requested information or data. Servlet 112 then invokes a service 120 which is analogous to the service proxy 116 of the requesting entity 102. In another embodiment, Servlet 112 facilitates communication with the appropriate responding entity 104 which invokes the service 120. Subsequent communication between requesting entity 102 and responding entity 104 is conducted between service proxy 116 and service 120 across web server 106.

The service proxy 116 dispatches messages containing requests for data or information obtained 140 from the requesting entity 102. Exemplary message requests are shown as "message a request" 126a, "message b request" 126b, and "message c request" 126c. A dispatcher 118 of the service proxy 116 constructs a message to include a message request 126a, 126b, 126c, which is then transmitted 142 across web server 106, in one embodiment, and received by service 120. A delegate broker 122 of service 120 uses a delegate registry 124 to provide 144 the received message request to the appropriate delegate for processing to obtain the response. In the illustrated service model 100, an exemplary delegate registry 124 shows the assignment of specific message requests to specific delegates, and exemplary delegates are shown as "delegate a" 130a, "delegate b" 130b, and "delegate c" 130c. The received message requests are shown as "message a request" 126a' in "delegate a" 130a, "message b request" 126b' in "delegate b" 130b, and "message c request" 126c' in "delegate c" 130c.

The delegates 130a, 130b, 130c, process the message requests 126a', 126b' 126c', to provide responses, shown as 128a', 128b', and 128c'. Each of the delegates 130a, 130b, 130c, is configured to process a particular type of request. Delegate registry 124 details the pairing of specific requests 126a, 126b, 126c, to be received by service 120 with the correct delegate 130a, 130b 130c, to process each request 126a', 126b' 126c' and obtain the data or information to supply the appropriate response 128a', 128b', 128c'. The delegate broker 122 obtains 146 message responses 128a', 128b', 128c', from delegates 130a, 130b, 130c, and service 120 transmits 148 message responses 128a', 128b', 128c' to web server 106, and, in one embodiment, Servlet 112 formats and transmits 148 message responses 128a', 128b', 128c', to service proxy 116. In another embodiment, service 120 transmits 148 formatted message responses 128a', 128b' 128c' across web server 106 to service proxy 116. Service proxy 116 processes the received transmission to provide 150 the responses to the requesting entity 102, shown as "message a response" 128a, "message b response" 128b, and "message c response" 128c.

In another embodiment of the invention, the exchange is with a data source 114 that does not require transmission across web server 106. By way of example, dispatcher 118 uses a file protocol to transmit 152 a request and obtain 154 a response 115, which is then provided to the requesting entity 102. Service model 100 provides for information or data exchange by implementing the appropriate format and protocol as dictated by the source of the desired information.

Figure 2:
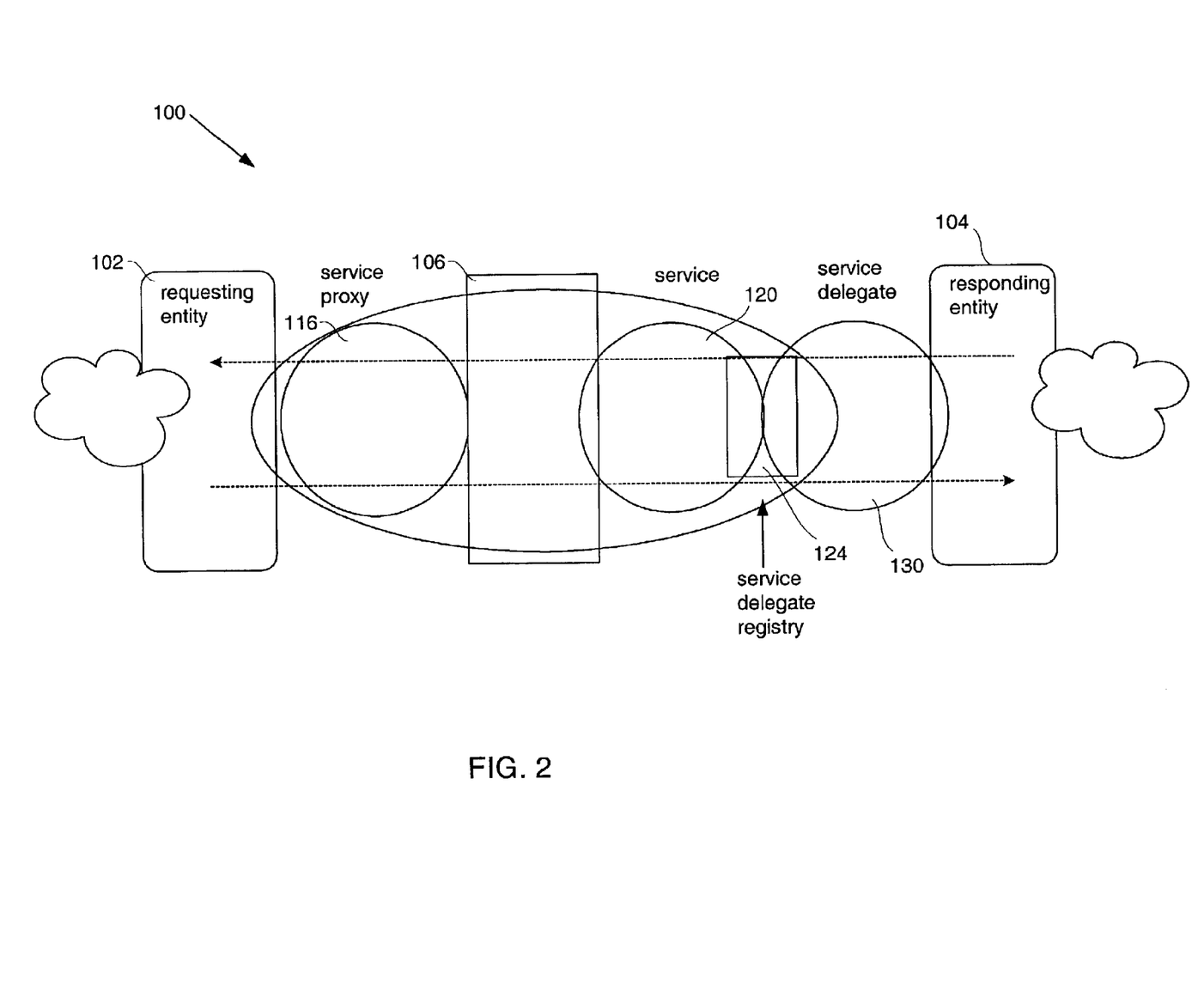
FIG. 2 illustrates service model described in FIG. 1 in accordance with another embodiment of the present invention.

FIG. 2 illustrates service model 100 described in FIG. 1 in accordance with another embodiment of the present invention. In FIG. 2, service model 100 is shown as a linear path of information exchange between a requesting entity 102 and a responding entity 104. In the embodiment depicted in FIG. 2, requesting entity 102 invokes service proxy 116 to broker data or information exchange across web server 106. In one embodiment, a Servlet (not shown in FIG. 2) on web server 106 invokes service 120 having a delegate broker (not shown in FIG. 2). Using service delegate registry 124, service 120 transmits a request for information or data to the appropriate service delegate 130 which processes the request and obtains a response from responding entity 104. Service 120 obtains response from service delegate 130, and transmits the response across web server 106 to service proxy 116. Service proxy 116 provides the response to requesting entity 102.

Service model 100 illustrates an exchange of information between a requesting entity 102 and a responding entity 104 that can range from the very simple request and response, to a complex series of multiple exchanges, conditional processes, a plurality of disparate source locations, and the like. As is known, process implementations to accomplish the range of possible exchanges can also vary from the very simple iteration of steps to perform simple tasks, to the detailed and complex specific iterations for a plurality of conditions and processes. In one embodiment of the present invention, service model 100 is implemented to accomplish a plurality of data or information exchange scenarios using elementary communication formatting protocols and routines.

By way of example, HTTP (HyperText Transfer Protocol) is implemented in the web environment using the elementary calls of "get," "post," and "message." In one embodiment of the present invention, service model 100 is implemented with HTTP protocol to exchange data with a responding entity 104 by way of a web server 106. As is described in greater detail below, a request is put into a message which is then processed through a dispatchable interface as a get message or a post message to a Servlet on a web server 106. The Servlet receives a response which is transmitted back to the service proxy 116 which removes the response from the message and provides the requested data or information to the requesting entity 102.

In one embodiment of the present invention, a requesting entity 102 desires to obtain, provide, or exchange data or information with a responding entity 104. The request is formatted in a protocol to be transmitted to web server 106 and processed by Servlet 112 (see FIG. 1). Using HTTP protocol, the request is wrapped in a "message." An HTTP message is a specific format and protocol for transmitting data. In one embodiment of the present invention, a request for information or data is wrapped in an HTTP message as illustrated in Table 1.

TABLE 1

| MESSAGE |
| --- |
| +Message( ) |
| +Message(Map headers) |
| +Message(String body) |
| +Message(Map headers, String body) |
| +setHeader(String key, String value) |
| +getHeader(String key) : String |
| +getHeaderKeys( ) : Iterator |
| +getSessionId( ) : String |
| +removeHeader(String key) |
| +getBody( ) : String |
| +setBody(String body) |

TABLE 1-continued

| MESSAGE |
| --- |
| +hasBody( ) : boolean |
| +toString( ) : String |

As can be seen in Table 1, an HTTP message in accordance with one embodiment of the present invention is some "body," and associated headers, that include the request to obtain, provide, or exchange information with a responding entity, and wrapped in the MIME (Multipurpose Internet Mail Extension) protocol headers providing for message transmission to a web server.

An HTTP message such as that illustrated in Table 1, is transmitted to a web server using a "get" or "post" message class. As is known, an HTTP GetMessage is a class, and an HTTP PostMessage is another class that extends the GetMessage class. Table 2 shows an exemplary GetMessage in accordance with one embodiment of the present invention:

TABLE 2

| GETMESSAGE |
| --- |
| method : String = null |
| message : Message = null |
| connection : URLConnection = null |
| +GetMessage( ) |
| +GetMessage(URL url) |

TABLE 2-continued

| GETMESSAGE |
| --- |
| +Getmessage(URL url, Message message) |
| +getURL( ) : URL |
| +setURL(URL url) |
| +getHeader(String key) : String |
| +getHeaderKeys( ) : Iterator |
| +setHeaders(Map headers) |
| +setHeader(String key, String value) |
| +removeHeader(String Key) |
| +isUnicodeEncoding( ) : boolean |
| +setUnicodeEncoding(boolean isUnicodeEncoding) |
| +isFollowRedirect( ) : boolean |
| +setFollowRedirect(boolean isFollowRedirect) |
| +dispatch( ) : Message |
| +toString( ) : String |
| getBody( ) : String |
| setBody(String body) |
| openConnection( ) |
| closeConnection( ) |
| doGet( ) |
| getResponse( ) : Message |

The GetMessage class as illustrated in Table 2, takes the message (see Table 1), and provides for dispatching it to a web server. It should be noted in Table 2 that one embodiment of the present invention includes the synchronous actions of transmitting a message and receiving a response.

Table 3 shows an embodiment of a PostMessage class in accordance with the present invention:

TABLE 3

| GETMESSAGE |
| --- |
| method : String = null |
| message : Message = null |
| connection : URLConnection = null |
| +GetMessage( ) |
| +GetMessage(URL url) |
| +GetMessage(URL url, Message message) |
| +getURL( ) : URL |
| +setURL(URL url) |
| +getHeader(String key) : String |
| +getHeaderKeys( ) : Iterator |
| +setHeaders(Map headers) |
| +setHeader(String key, String value) |
| +removeHeader(String Key) |
| +isUnicodeEncoding( ) : boolean |
| +setUnicodeEncoding(boolean isUnicodeEncoding) |
| +isFollowRedirect( ) : boolean |
| +isFollowRedirect(boolean isFollow Redirect) |
| +dispatch( ) : Message |
| +toString( ) : String |
| getBody( ) : String |
| setBody(String body) |
| openConnection( ) |
| closeConnection( ) |
| doGet( ) |
| getResponse( ) : Message |

| POSTMESSAGE |
| --- |
| +PostMessage( ) |
| +PostMessage(URL url) |
| +PostMessage(URL url, String message) |
| +PostMessage(URL url, Message message) |
| +setContentType(String contentType) |
| +getContentType( ) : String |
| +setBody(String body) |
| +getBody( ) : String |
| +dispatch( ) : Message |
| +toString( ) : String |
| doPost( ) |

In one embodiment of the present invention, the web server interactions of get or post are managed by the service proxy 116. Both get and post are transmitted to a web server 106 by a dispatch method, using a dispatchable interface. One embodiment of a dispatchable interface is shown in Table 4:

TABLE 4

<<interface>>
Dispatchable

+getURL( ) : URL
+setURL(URL)
+getHeader(String key) : String
+getHeaderKeys( ) : Iterator
+setHeaders(Map headers)
+setHeader(String key, String value)
+removeHeader(String key)
+isUnicodeEncoding( ) : Boolean
+setUnicodeEncoding(boolean isUnicodeEncoding)
+isFollowRedirect( ) : boolean
+setFollowRedirect(boolean isFollowRedirect)
+dispatch( ) : Message Tables 1–4 illustrate an embodiment of the present invention in which a request to obtain, provide, or exchange information is wrapped in a message and transmitted to a web server 106 using HTTP protocol. In this manner, XML is transmitted over HTTP (or HTTP(S), FTP, or other protocol) in a message exchange framework. Further, as illustrated in FIG. 1 and FIG. 2, enabling XML to be transmitted over HTTP (or HTTP(S), FTP, or other protocol) web-enables at least the two participating entities (requesting entity 102 and responding entity 104), and potentially a plurality of entities participating in the exchange of information.

The illustrated embodiment includes the synchronous actions of request and response, and therefore, once a request is transmitted through dispatchable interface, a response is anticipated (see the last line of GETMESSAGE in Tables 2 and 3). It should be understood that it is the illustrated actions of request and response that are synchronous, and not necessarily the underlying transactions. By way of example, a request action may stimulate a response consisting of acknowledgment of receipt of the request. In one embodiment, the transmission of the requested information or data may occur as a synchronous response to a request, and in another embodiment, the requested information or data may be transmitted as a request action in a separate exchange.

In one embodiment, the request message is formatted and transmitted to a web server 106 by service proxy 116. The dispatchable interface (see Table 4) is an interface between service proxy 116 and web server 106 providing for the transmission of an HTTP message as one of a GetMessage (Table 2) and a PostMessage (Table 3).

In one embodiment of the invention, the GetMessage or PostMessage is transmitted to web server 106 and processed by Servlet 112. In addition to the above described functions of invoking service 120 for processing of transmitted requests, Servlet 112 extracts the request from the GetMessage or PostMessage and provides the request to service 120 for processing by delegate broker 122. Once a response has been obtained from responding entity 104 by the appropriate delegate, service 120 provides the response to Servlet 112 which formats the response into a response message which is then transmitted back to service proxy 116.

In another embodiment, the Servlet 112 facilitates the communication between the service proxy 116 and the service 120. Once communication is established, the request as a GetMessage or PostMessage is transmitted from service proxy 116 to service 120, and a response as a GetMessage or PostMessage is transmitted from service 120 to service proxy 116.

It should be appreciated that, although the illustrated service model 100 has been described as an information or data exchange between a requesting entity 102 and a responding entity 104, exchange of data or information is a two-way operation, and therefore a requesting entity 102 in one embodiment can be a responding entity 104 in another embodiment, and the responding entity 104 in one embodiment can be a requesting entity 102 in another embodiment. Additionally, service model 100 can include a plurality of requesting entities 102, a plurality of responding entities 104, as well as a plurality of combinations of one or more requesting entities 102 and one or more responding entities 104. By way of example, a requesting entity 102 can transmit a request to a responding entity 104, and the responding entity 104, in order to provide the requested information, transmits one or more requests to one or more different responding entities, and so forth. A plurality of embodiments of the present invention, therefore, provide for communication exchange through client-server, peer-to-peer, multicast, chaining, and other communication configurations.

Figure 3A:
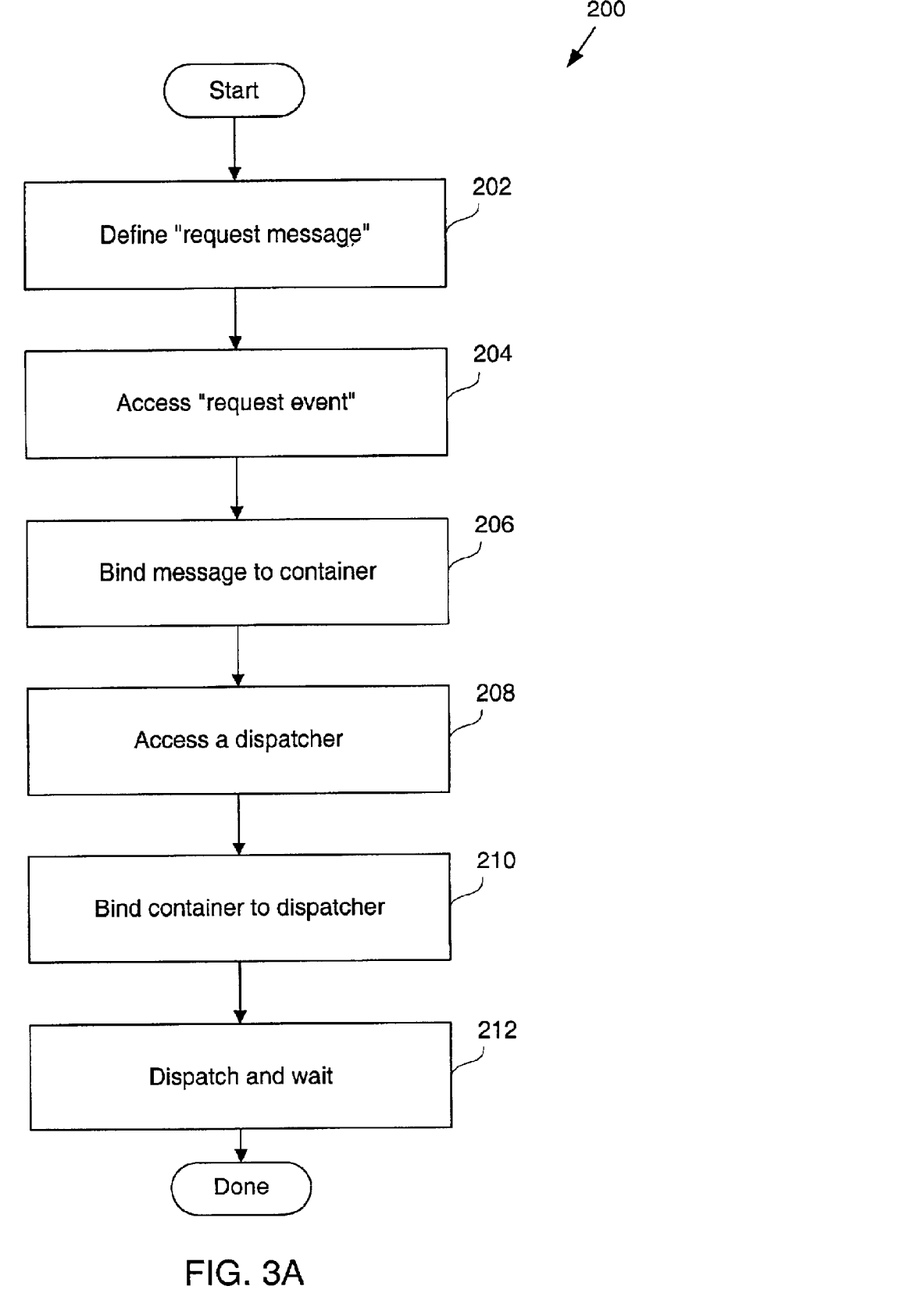
FIG. 3A is a flow chart diagram illustrating the method operations performed as general functional processes in the creation and dispatch of a request message in accordance with an embodiment of the invention.
Figure 3B:
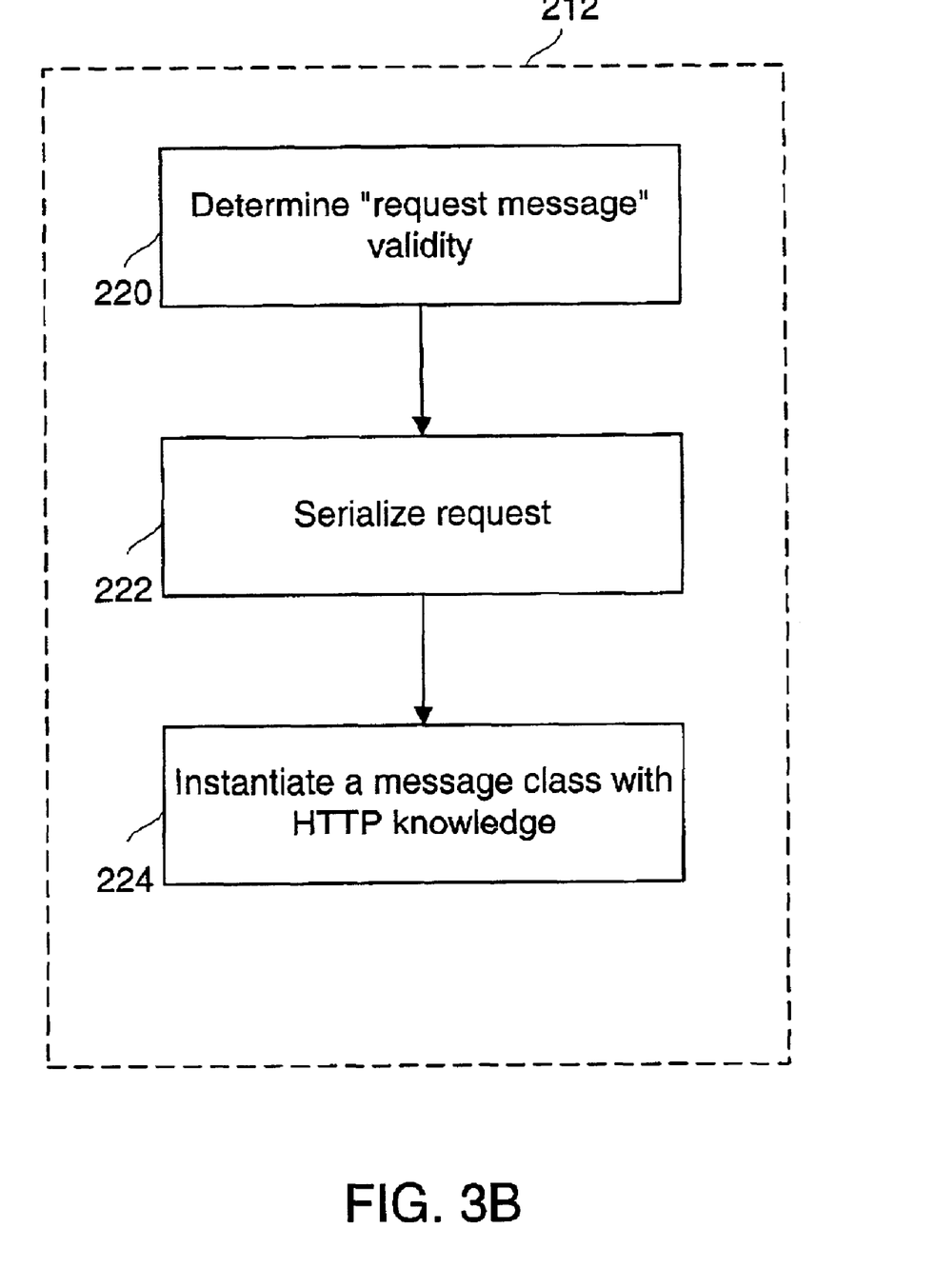
FIG. 3B illustrates additional detailed method operations accomplished in method operation 212 of the flowchart illustrated in FIG. 3A, in accordance with one embodiment of the present invention.
Figure 4:
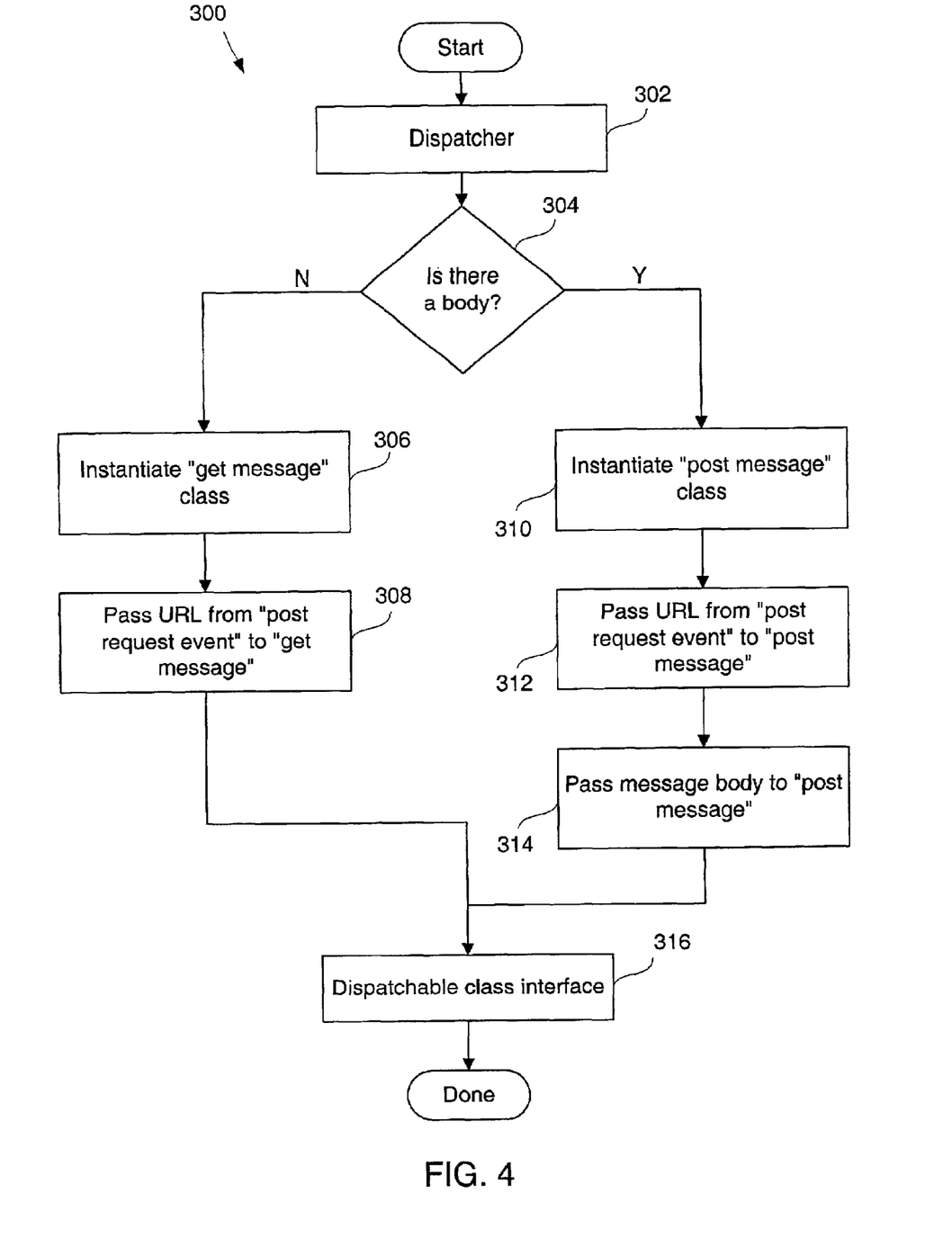
FIG. 4 is a flow chart diagram illustrating method operations performed by the dispatcher of the service proxy in accordance with an embodiment of the invention.

FIGS. 3A, 3B, and 4 illustrate method operations performed by a requesting entity 102 through service proxy 116 in accordance with one embodiment of the present invention. In FIG. 3A, a flow chart diagram 200 illustrates the method operations performed as general functional processes in the creation and dispatch of a request message in accordance with an embodiment of the invention.

The method begins with operation 202 in which the request message is defined. A plurality of processes are accomplished in defining the request message. In one embodiment, a negotiation or exchange occurs between a service proxy 116 (see FIGS. 1 and 2) and a service 120 (see FIGS. 1 and 2). The negotiation includes the establishing of a message format (e.g., XML, JDK, binary, etc.), and general subject or nature of the request. As described above in reference to FIGS. 1 and 2, a delegate broker uses a delegate registry to route specific requests to specific, appropriate delegates for processing and obtaining the requested information or data from a responding entity. In one embodiment of the invention, the delegate registry contains the mapping of requests to delegates. The specific mapping contained in the delegate registry is established during operation 202 when the request message is defined.

In one embodiment of the invention, the same request may be transmitted multiple times. By way of example, in a business-to-business exchange in which information is periodically updated, a request may be repeatedly transmitted to obtain a continually updated response. In such an exchange, the requesting entity, the web server, the responding entity, and the request may remain constant. In operation 202, the defining of the request message includes the determining if the same request message has been previously transmitted by the same service proxy to the same service. If a message transmission is being repeated, no negotiation is necessary. In one embodiment, each exchange of data or information between a requesting entity and a responding entity results in a session ID being assigned to the requesting entity. A session ID is retained by the service proxy for use by the Servlet (or service proxy and service) to, for example, avoid unnecessary validation, verification of access, and the like. Although, in one embodiment, a message is instantiated for each request, instantiating a message includes calling the session ID (see Table 1), if one exists, and if a session ID exists, the defining in operation 202 is reduced or eliminated as appropriate. The session ID, therefore, enables stateful communication between a service proxy and service.

Once the request message is defined in operation 202, the method continues with operation 204 in which a request event is accessed. The accessing of a request event includes instantiating a request event, or re-using a request event that has previously been instantiated. In one embodiment, a request event must be instantiated at least once. Once instantiated, the request event is accessed or re-used as necessary for repeated occurrences of the same request event.

A request event is the operation that triggers the series of events that occur to accomplish a data or information exchange once a request message has been defined. In one embodiment of the invention, the request event is the creation of the container, the message, in which the request message is transmitted.

Once the request message is accessed in operation 204, the method advances to operation 206 in which the message is bound to the container. In one embodiment, the "message" of operation 204 is the request message defined in operation 202, which is the request to obtain, provide, or exchange data or information with a responding entity. The container of operation 206 is the instantiation of the message class as illustrated in Table 1. As illustrated in Table 1, instantiating the message class includes getting a body, if a message body exists for the particular exchange event. In operation 206, the message that is bound to the container may include the "body" listed in Table 1.

Following the binding of the message to the container in operation 206, the method continues with operation 208 in which a dispatcher is accessed. The accessing of a dispatcher includes instantiating a dispatcher, or re-using a dispatcher that has previously been instantiated. In one embodiment, a dispatcher for a specific service proxy must be instantiated at least once. Once instantiated, the dispatcher is accessed or re-used as necessary for repeated request dispatch.

In one embodiment of the invention, a dispatcher, using either GetMessage or PostMessage as appropriate, transmits or dispatches the message through a dispatchable interface to a web server. As described above, a dispatcher may be instantiated once, and then re-set and re-used as necessary for multiple or repeated requests. A session ID assigned by the web server is retained by the service proxy, allowing repeated and multiple exchanges between the requesting entity and the responding entity using a dispatcher that is instantiated one time.

It should be further noted that although a dispatcher need only be instantiated once and re-used as appropriate, a dispatcher is not pre-programmed with code for the plurality of protocol which can be used in the exchange of data or information, in one embodiment of the invention. When a dispatcher is accessed, the dispatcher will be provided the URL of the destination web server. The dispatcher obtains protocol handlers appropriate for the destination URL. One embodiment of the present invention is therefore protocol agnostic, and easily implemented without limitation by destination protocol. The specific function of a dispatcher is described in greater detail in reference to FIG. 4 below.

The method advances to operation 210 in which the container is bound to the dispatcher. Following operation 210, the method concludes with operation 212 in which the dispatcher dispatches the message and waits for a response.

As described earlier, flowchart 200 illustrates those method operations accomplished by the requesting entity through the service proxy. Once the dispatcher of the service proxy dispatches the container having the request message through dispatchable interface, the service proxy awaits a response (see Tables 1–4). Succeeding operations are accomplished by the service and responding entity, and therefore the method of the requesting entity is done.

FIG. 3B illustrates additional detailed method operations accomplished in method operation 212 of flowchart 200 illustrated in FIG. 3A in accordance with one embodiment of the present invention. Operation 212 includes operation 220 in which the validity of the request message is determined. In one embodiment, the determining of the validity of the request message is an optional method operation in which a check is performed to verify the request message to be transmitted. Each request message can contain specific guidelines for verification of validity, but typically involve a request for verification from the dispatcher to the requesting entity, and an boolean reply of valid or not valid.

The operation proceeds, if optional method operation 220 is performed and a response of valid is returned, with method operation 222 in which the request message is serialized. In one embodiment, the serialization of the request message includes the translation of the message request into XML, binary, or other format, to provide for transmission of the message request as a part of the HTTP message (see Table 1). In an embodiment of the invention, the serialization is accomplished at the time of dispatch, and is therefore illustrated as a detailed method operation in FIG. 3B.

In method operation 224, a message class with HTTP knowledge is instantiated. An exemplary message class is illustrated in Table 1. In one embodiment of the invention, the message class has HTTP knowledge because a URL that has been provided (see Tables 2, 3, and 4, and operation 208 above) dictates HTTP protocol. As described above in reference to operation 208 of flowchart 200, the dispatcher of the service proxy has no pre-programmed knowledge of the required protocol. When the dispatcher is provided the web server URL, the dispatcher obtains the appropriate protocol handlers dictated by the protocol of the destination URL. Similarly, when the message class is instantiated, the URL of the destination web server is known, and the protocol handlers are provided based on the protocol of the destination URL. In one embodiment, the destination web server uses HTTP protocol, and the message class is instantiated with HTTP knowledge.

It should be appreciated that corresponding actions and events occur on the back side of the exchange in accordance with known web services operations. In one embodiment, a Servlet on a web server invokes a service which is analogous to the service proxy of the requesting entity (see FIGS. 1 and 2). When a Servlet processes a request for information, data, or exchange, a service is used to broker the communication with an appropriate responding entity, or service for the responding entity. In another embodiment, the Servlet facilitates the communication between the requesting entity and the responding entity, and once established, the communication exchange is conducted between the service proxy and the service.

Using a delegate registry to map requests with appropriate delegates for obtaining responses from responding entities, a delegate broker of the service transmits requests to the corresponding delegates which receive, process, and exchange information with a responding entity. Delegates provide responses to the service which in turn provides responses to the Servlet, or across the web service to the service proxy. In one embodiment of the present invention, the service constructs the response in the message exchange framework and transmits the message to the service proxy. In another embodiment, the service provides the responses to the Servlet which constructs the response in the message exchange framework and transmits the message to the service proxy.

FIG. 4 is a flow chart diagram 300 illustrating method operations performed by the dispatcher of the service proxy in accordance with an embodiment of the invention. The flow chart 300 begins with the dispatcher 302. As described above in reference to FIG. 3A, a dispatcher is instantiated or re-used as required by the service proxy of the requesting entity. In one embodiment of the invention, a dispatcher is not pre-programmed with the plurality of possible protocol handlers required for all of the possible protocol with which it may transmit a request. When the service proxy of the requesting entity instantiates a dispatcher, or accesses an existing dispatcher to re-use, the service proxy instantiates or accesses the dispatcher with knowledge of the destination URL. The dispatcher therefore obtains the required protocol handlers in accordance with the protocol of the destination URL. In one embodiment, the protocol is HTTP. In other embodiments, the protocol can be HTTP(S), FTP, file, Gopher, and the like. The illustrated embodiment uses HTTP/(S) protocol, but it should be appreciated that embodiments of the present invention can be implemented for a plurality of protocols. One embodiment of the present invention is therefore protocol-agnostic, and can be implemented regardless of destination protocol. Further, by obtaining the protocol handlers for the communication protocol of the destination URL provides for changing protocol at runtime, no compilation required, to access local, remote and secure services in a common fashion.

Once accessed, the dispatcher performs a number of method operations as illustrated in flow chart diagram 300. Table 5 is provided to illustrate an embodiment of a dispatcher, containing method operations described in reference to the remaining method operations of flow chart diagram 300:

TABLE 5

DISPATCHER

```
public Message dispatch(URL url, Map queryString, Message message)
        throws IOException {
        URL u = bindQueryString(url, queryString);
        Dispatchable dispatcher = null;
        Message response = null;
    while (u != null) {
    dispatcher = (message != null ?
                new PostMessage(u, message) : new GetMessage(u));
    u = null;
    if(this.profile.isCookieEnabled( )) {
        if(this.sessionId != null) {
            dispatcher.setHeader(COOKIE_HEADER,
                        SESSION_ID + EQUAL + this.sessionId);
        }
    }
    response = dispatcher.dispatch( );
    if (response != null) {
        String location = response.getHeader(LOCATION_HEADER);
            if (location != null) {
                try {
                u = new URL(location);
                } catch (MalformedURLException mue) {
                if (VERBOSE) { mue.printStackTrace( );
                }
```

TABLE 5-continued

DISPATCHER

```
            }
        }
    }
    if (response != null) {
        this.sessionId = response.getSessionId( );
    }
    return response;
}
```

Returning to FIG. 4, the dispatcher determines whether the request message has a message body, as shown in decision block 304. If there is no message body, a "no" to decision block 304, the dispatcher will instantiate a GetMessage for transmission through the dispatchable interface to the web server. The method is illustrated by operation 306 in which the dispatcher instantiates a GetMessage class (see Table 2). The method continues with operation 308 in which the dispatcher passes the destination URL from post request event to GetMessage. The GetMessage is then dispatched through the dispatchable class interface in operation 316.

If the request message has a message body, a "yes" to decision block 304, the dispatcher instantiates PostMessage, as shown in operation 310. As described above in reference to Tables 2 and 3, PostMessage class extends GetMessage class, as shown in Table 3.

After instantiating a PostMessage in operation 310, the method continues with operation 312 in which the destination URL is passed from post request event to PostMessage.

The method then continues with operation 314 in which the message body is passed to PostMessage. As described above in reference to decision block 304, if a message body is a part of the transaction or communication exchange, in one embodiment, PostMessage is used. Operation 314 passes the message body to the PostMessage (see Tables 3, 5), enabling the method to continue with operation 316 in which the PostMessage is transmitted through the dispatchable class interface (see Table 4).

In one embodiment of the invention, the service model is implemented using high-level protocols based on open and standard APIs. Table 6 illustrates another embodiment of a dispatcher in which the HTTP re-direct logic has been removed from the dispatcher and re-implemented so that the dispatchable (see Table 4) handles HTTP re-directs. The embodiment illustrated in Table 6 yields the same functional results as the embodiment illustrated in Table 5.

TABLE 6

DISPATCHER

```
public Message dispatch(URL url, Map queryString, Message message)
        throws IOException {
        URL u = bindQueryString(url, queryString);
        Dispatchable dispatcher = null;
        Message response = null;
        dispatcher = (message != null ?
                new PostMessage(u, message) : new GetMessage(u));
        if(this.profile.isCookieEnabled( )) {
            if(this.sessionId != null) {
                dispatcher.setHeader(COOKIE_HEADER,
                            SESSION_ID + EQUAL + this.sessionId);
            }
        }
        response = dispatcher.dispatch( );
```

TABLE 6-continued

DISPATCHER

```
        if (response != null) {
            this.sessionId = response.getSessionId( );
        }
        return response;
}
```

Figure 5:
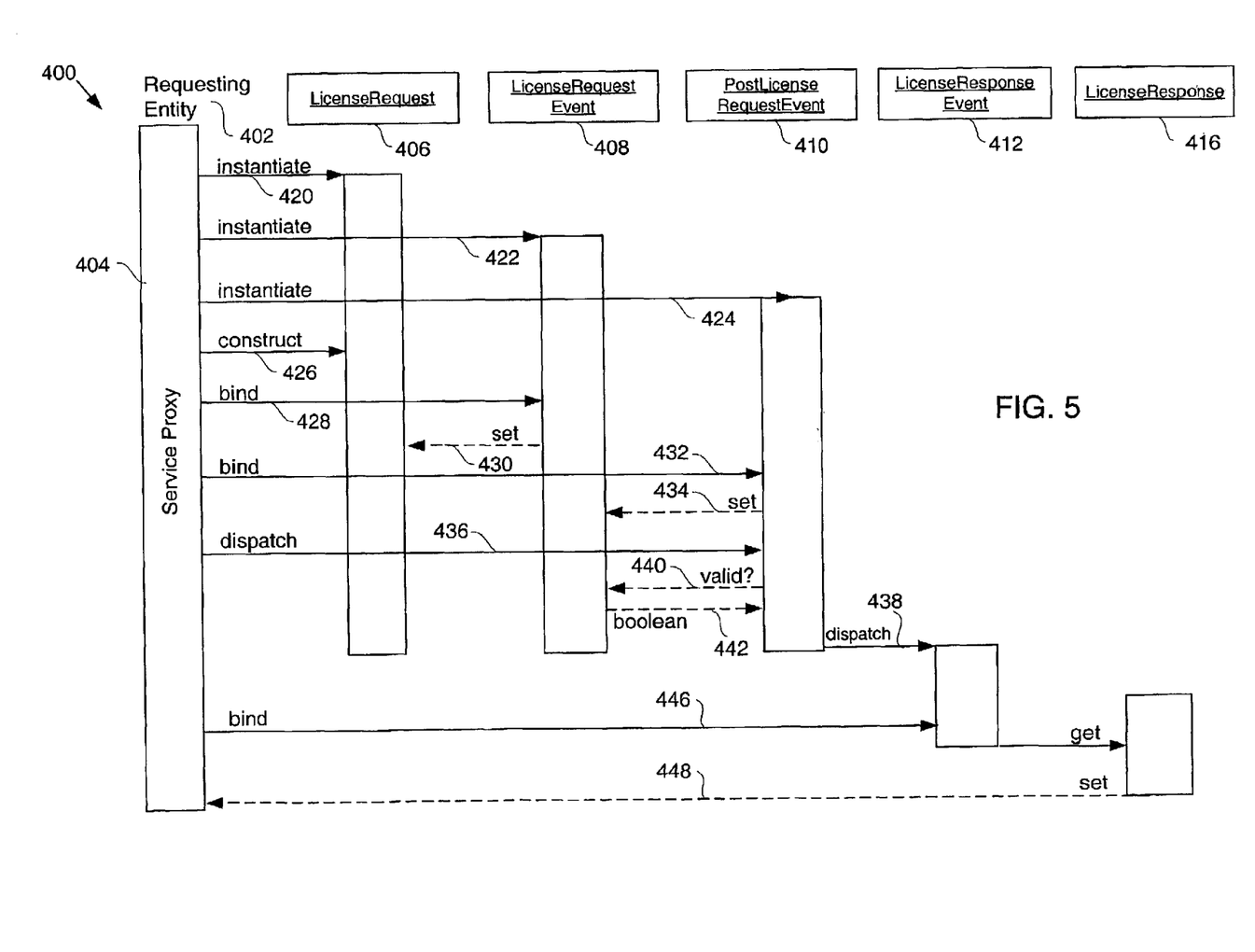
FIG. 5 is an event diagram illustrating a business model implementation of the service model in accordance with one embodiment of the invention.

FIG. 5 is an event diagram 400 illustrating a business model implementation of the service model in accordance with one embodiment of the invention. In FIG. 5, the business model includes a customer as a requesting entity 402 having, by way of example, a hardware system and requesting a license to enable implementation, or requesting a right to use (RTU) serial number. The events illustrated in event diagram 400 are generally those events that are initiated by or directed by the requesting entity 402 through service proxy 404. The illustrated events are across the top of the event diagram 400, and include a LicenseRequest 406, LicenseRequestEvent 408, PostLicenseRequestEvent 410, LicenseResponseEvent 412, and LicenseResponse 416. Actions associated with the events are shown by arrows between events as described below. Of course, "License" is just one type of message data, and in function, any type of data can be replaced for "License."

In one embodiment of the invention, the service proxy instantiates 420 a LicenseRequest 406, instantiates 422 a LicenseRequestEvent 408, and instantiates 424 a PostLicenseRequestEvent 410. In the illustrated example, the request message is a license request. Once the license request has been defined (see FIG. 3A), the event diagram illustrates the instantiation of the objects that will be required to conduct the exchange of information, in accordance with one embodiment of the invention. In other embodiments, as described above, objects such as the dispatcher (analogous to PostLicenseRequestEvent 410 in FIG. 5), once instantiated, may be re-set and re-used, and thereby obviating the need to instantiate the objects for subsequent data exchange events.

After the objects have been instantiated, the service proxy directs the construction 426 of the LicenseRequest 406. The construction 426 of the LicenseRequest 406 includes the providing of the specific request data or information to the dispatchable objects which, in the instant example, can be dispatched as a LicenseRequest 406.

The next event is the binding of the LicenseRequest 406 to the LicenseRequestEvent 408. As described above in reference to FIG. 3A, a request event is the operation that triggers the series of events that occur to accomplish a data or information exchange once a request message has been defined. In the embodiment illustrated in FIG. 5, the request event is the LicenseRequestEvent 408, and the request message is the LicenseRequest 406. The LicenseRequestEvent 408, therefore, is the creation of the container, the HTTP message, in which the LicenseRequest 406 will be transmitted. The binding 428 of the LicenseRequest 406 to the LicenseRequestEvent 408. is set at 430, managing, in one embodiment, an XML formalization of the LicenseRequest 406.

The LicenseRequestEvent 408 having the LicenseRequest is then bound 432 to the PostLicenseRequestEvent 410. The binding 432 represents the joining of a specific LicenseRequestEvent 408 having a LicenseRequest 406 with a dispatcher. As described above in one embodiment of the invention, the dispatcher is instantiated by the service proxy 404, and using either GetMessage or PostMessage as appropriate, transmits or dispatches the message through a dispatchable interface to a web server. In the illustrated business model of FIG. 5, the message is the LicenseRequest 408 bound with a LicenseRequestEvent 408. The dispatcher was instantiated at 424, the LicenseRequestEvent 408 having a LicenseRequest 406 is bound 432 to the PostLicenseRequestEvent 410, and set at 434.

In one embodiment of the invention, service proxy 404 then directs dispatcher to dispatch 436 the message. The dispatcher, having received the command to dispatch 436, may optionally perform a validity check 440, and a boolean response 442 is supplied. In one embodiment, the validity check 440 is optional, and each message request defines specific parameters for validity verification. If a validity check 440 is performed, and a valid boolean response is received 442, the dispatcher proceeds with dispatch 438 of the license request.

In one embodiment, the dispatcher dispatches 438 the license request including a container for the expected response. As described above in reference to FIG. 1, in one embodiment of the invention, the service model is synchronous. A request is transmitted and a response is received. As described above in reference to Tables 1–4, in one embodiment it is the event or action that is synchronous and not necessarily the underlying transaction. In the instant example, the synchronous response is, in one embodiment, an acknowledgment of receipt of the LicenseRequest 406. In another embodiment, the synchronous response is the LicenseResponse 416 In the illustrated business model of FIG. 5, when a LicenseRequestEvent 408 having a LicenseRequest 406 is dispatched 438, service proxy 404 sets up for the expected response by creating a container 446 for the expected response. The LicenseResponseEvent 412 is analogous to the LicenseRequestEvent 408, and used for the expected LicenseResponse 416.

Once a LicenseResponse 416 is provided by a responding entity, the LicenseResponse 416 is transmitted to the service proxy 404 in much the same manner in which the LicenseRequest 406 was transmitted to the service. It should be appreciated that FIG. 5 illustrates a series of events as occurs from a Requesting Entity 402 perspective. In one embodiment, a corresponding series of events occur in the service of the responding entity, but are not illustrated for clarity. As described earlier, a responding entity may be required to initiate additional requests to obtain and provide the requested data. In such an example, the responding entity for a transaction becomes a requesting entity for a separate and intermediate transaction. In one embodiment of the present invention, the service model is implemented such that participating entities act as peers in the resulting information and data exchanges, regardless of locality, security, and other specific URL protocol handler implementations.

As described above, the business model illustrated in the embodiment of FIG. 5 can be used for such business transactions as requesting and obtaining a license for a particular hardware or software entitlements, or for requesting and obtaining a right to use (RTU) that must be presented before additional data, components, and the like can be obtained from another party. An exemplary license request, in accordance with one embodiment of the invention is illustrated in Table 7:

TABLE 7

LICENSE REQUEST

```
LicenseRequest request = buildLicenseRequest( );
LicenseRequestEvent requestEvent = new LicenseRequestEvent( );
RequestEvent.set.LicenseRequest(request);
System.out.println("request: " + '\n' + requestEvent.toMessage( ) + '\n');
    PostLicenseRequestEvent dispatcher =
    buildLicenseRequestDispatcher( );
    LicenseResponseEvent responseEvent = null;
    If (dispatcher != null) {
        Dispatcher.setEvent(requestEvent);
        try {
            responseEvent = (LicenseResponseEvent)(dispatcher.dispatch( ));
        }catch (Exception e) {
            e.printStackTrace( );
        }
    }
System.out.println("response: " + '\n' + (responseEvent != null ?
responseEvent.toMessage( ).toString( ) : "null") + '\n');
LicenseResponse response = responseEvent != null ?
        ResponseEvent.getLicenseResponse( ) : null;
Systyem.out.println("LicenseResponse.key:>" + (response != null ?
response.getKey( ) : "null") + "<");
```

Table 8 illustrates another embodiment in which the request is for an RTU serial number:

TABLE 8

RTU SERIAL NUMBER REQUEST

```
RTUSerialNumberRequest request = buildRTUSeralNumberRequest( );
RTUSerialNumberREqeustEvent requestEvent =
        New RTUSerialNumberRequestEvent( );
    RequestEvent.setRTUSeralNumberRequest(request);
System.out.println("request: " + '\n' + requestEvent.toMessage( ) + '\n');
PostRTUSerialNumberRequestEvent dispatcher =
        buildRTUSeralNumberREqeustDispatcher( );
RTUSerialNumberResponseEvent responseEvent = null;
    If (dispatcher != null) {
        dispatcher.setEvent(requestEvent);
        try {
            responseEvent =
            (RTUSerialNumberResponseEvent)(dispatcher.dispatch( ));
        }catch (Exception e) {
            e.printStack Trace( );
        }
    }
System.out.println("response: " + '\n' + (responseEvent != null ?
responseEvent.toMessage( ).toString( ) : "null") + '\n');
    RTUSerialNumberResponse response = responseEvent != null ?
            responseEvent.getRTUSerialNumberResponse( ) : null;
```

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for establishing communication between computing entities interconnected over a network, the method comprising:
    (a) establishing communication with a web server to begin a communication exchange;
    (b) executing a service proxy to manage the communication exchange;
    (c) executing a dispatcher within the service proxy, the dispatcher configured to process the communication exchange, the processing of the communication exchange including,
        (i) defining a request;
        (ii) defining a container for enclosing the request;
        (iii) defining a post request event for dispatching the container having the request; and
        (iv) defining a response container for obtaining a response to the request; and
    (d) transmitting the container enclosing the request and the response over the network to a responding entity;
    wherein a response from the responding entity is received by the dispatcher in the response container.

2. The computer implemented method of claim 1, wherein the container for enclosing the request is a message class.

3. The computer implemented method of claim 2, wherein the post request event is configured to process the dispatching by,
    (a) determining if a body is present for the container; and
    (b) instantiating a post message class if the body is present, the post message class being configured to extend a get message class.

4. The computer implemented method of claim 3, further comprising:
    a dispatchable interface for use by the post request event to process the dispatching.

5. The computer implemented method of claim 2, wherein the post request event is configured to process the dispatching by obtaining protocol handlers for a communication protocol of a URL of the responding entity at runtime to access local, remote and secure services in a common fashion.

6. The computer implemented method of claim 2, wherein the post request event is configured to process the dispatching by,
    (a) determining if a body is present for the container; and
    (b) instantiating a get message class if no body is present, the get message class configured to facilitate retrieval of data.

7. The computer implemented method of claim 6, further comprising:
   a dispatchable interface for use by the post request event to process the dispatching.

8. The computer implemented method of claim 5, further comprising:
   accessing a web server, the web server having an Internet protocol, a communication protocol, and a servlet.

9. The computer implemented method of claim 8, wherein the Internet protocol is TCP/IP, and wherein the communication protocol includes HTTP, HTTP/S, FTP, File, and Gopher.

10. The computer implemented method of claim 5, further comprising a service, wherein the communication between entities is between the service proxy and the service, and going through the web server.

11. The computer implemented method of claim 10 further comprising a delegate broker, wherein the delegate broker is part of the service and is in communication with a delegate registry.

12. The computer implemented method of claim 5, further comprising:
   accessing the responding entity via file protocol directly from the dispatcher.

13. The computer implemented method of claim 5, further comprising a session ID, wherein the session ID enables stateful communication between the computing entities.

14. A method for enabling communication between a requesting entity and a responding entity, comprising:
   receiving a request at the requesting entity;
   obtaining the request by a service proxy, the service proxy configured to generate a message for the request;
   dispatching the message by the service proxy to a service, the dispatching of the message being through a web server; and
   receiving the message at the service having a delegate broker, the delegate broker being in communication with a delegate registry for associating the message with a delegate, the delegate being configured to communicate with the responding entity to process a transaction defined by the message.

15. The method of claim 14, further comprising:
   obtaining protocol handlers for a URL of the service, the obtaining configured to enable the dispatching at runtime without compilation, and further configured to enable access to services including local, remote, and secure services.

16. The method of claim 15, wherein the protocol handlers include HTTP, HTTPS, FTP, and File protocol handlers.

17. The method of claim 16, further comprising:
   instantiating a post request event, the post request event being instantiated in the service proxy and configured to:
   (a) select between a PostMessage and a GetMessage;
   (b) retain a session ID; and
   (c) dispatch a Message;
   wherein the Message is dispatched using a Dispatchable interface.

18. A computer readable media having program instructions for enabling communication between computing entities, the computer readable media comprising:
   program instructions for invoking a service proxy to process a request by a requesting entity, the processing including:
   (a) receiving the request from the requesting entity;
   (b) generating a message for the request;
   (c) dispatching the message to a service, the dispatching of the message being through a web server; and
   (d) preparing to receive a response;
   program instructions for receiving the message at the service, wherein the service includes a delegate broker;
   program instructions for formatting a response, wherein the response is obtained by the delegate broker; and
   program instructions for transmitting the response from the service to the service proxy.

19. The computer readable media of claim 18, further comprising:
   program instructions for obtaining protocol handlers for a URL of the service, the obtaining configured to enable the dispatching at runtime without compilation, and further configured to enable access to services including local, remote, and secure services.

20. The computer readable media of claim 19, further comprising:
   program instructions for instantiating a dispatcher, the dispatcher being instantiated in the service proxy and configured to retain a session ID, the session ID configured to enable repeated communication between computing entities without instantiating a new dispatcher for each communication.

* * * * *